United States Patent
Lin et al.

(10) Patent No.: US 12,413,130 B2
(45) Date of Patent: Sep. 9, 2025

(54) CONTROLLER FOR CONTROLLING BLOCKING SWITCH OF POWER CONVERTER

(71) Applicant: Power Forest Technology Corporation, Hsinchu County (TW)

(72) Inventors: Meng Hung Lin, Taichung (TW); Chien Lung Li, Hsinchu County (TW); Yi-Heng Wu, Changhua County (TW)

(73) Assignee: Power Forest Technology Corporation, Hsinchu County (TW)

( * ) Notice: Subject to any disclaimer, the term of this patent is extended or adjusted under 35 U.S.C. 154(b) by 202 days.

(21) Appl. No.: 18/508,261

(22) Filed: Nov. 14, 2023

(65) Prior Publication Data

US 2025/0112539 A1 Apr. 3, 2025

(30) Foreign Application Priority Data

Oct. 3, 2023 (TW) .................................. 112137828

(51) Int. Cl.
*H02M 1/00* (2007.01)
*H02M 1/32* (2007.01)

(52) U.S. Cl.
CPC ........... *H02M 1/0003* (2021.05); *H02M 1/32* (2013.01)

(58) Field of Classification Search
CPC .............................. H02M 1/0003; H02M 1/32
See application file for complete search history.

(56) References Cited

U.S. PATENT DOCUMENTS

| 2020/0021282 A1* | 1/2020 | Yamamoto ........... H03K 17/168 |
| 2021/0036697 A1* | 2/2021 | Yamamoto ......... H03K 17/0822 |
| 2022/0416782 A1 | 12/2022 | Akiyama et al. |

FOREIGN PATENT DOCUMENTS

| CN | 107112887 | 8/2017 |
| CN | 112054701 | 12/2020 |
| JP | 2002091585 | 3/2002 |
| JP | 2018153007 | 9/2018 |
| TW | 200703868 | 1/2007 |
| WO | 2020250908 | 12/2020 |

OTHER PUBLICATIONS

"Office Action of Taiwan Counterpart Application", issued on Feb. 29, 2024, p. 1-p. 8.

* cited by examiner

*Primary Examiner* — Rafael O De Leon Domenech
(74) *Attorney, Agent, or Firm* — JCIPRNET

(57) ABSTRACT

A controller for controlling a blocking switch of a power converter is provided. The controller includes a control pin and a sensing circuit. The control pin is coupled to a control terminal of the blocking switch and an output terminal of the blocking switch. The sensing circuit includes a control switch, a variable resistance circuit, and a judgment circuit. A first terminal of the control switch is coupled to the control pin. The variable resistance circuit is coupled between a second terminal of the control switch and a reference low voltage. The judgment circuit controls the variable resistance circuit to provide a detection resistance value with a minimum value, and turns on the control switch to obtain a sensing voltage value. When the detection resistance value has a maximum value and the sensing voltage value is lower than a reference voltage value, the judgment circuit provides a notification signal.

10 Claims, 4 Drawing Sheets

CONTROLLER FOR CONTROLLING BLOCKING SWITCH OF POWER CONVERTER

CROSS-REFERENCE TO RELATED APPLICATION

This application claims the priority benefit of Taiwan application serial no. 112137828, filed on Oct. 3, 2023. The entirety of the above-mentioned patent application is hereby incorporated by reference herein and made a part of this specification.

BACKGROUND

Technical Field

The disclosure relates to a controller, and in particular to a controller for controlling a blocking switch of a power converter.

Description of Related Art

Generally speaking, a power converter may output an output power provided by the power converter through a blocking switch. Based on Vsafe0V standard, when a voltage value at an output terminal of the blocking switch is lower than a standard value (for example, 0 to 0.8 volts), the blocking switch is allowed to be turned on. Therefore, a controller for controlling the blocking switch must have a control pin for controlling the blocking switch and a detection pin for detecting the voltage value at the output terminal (for example, a Vbus terminal) of the blocking switch.

Based on the trend of size reduction of elements, the number of pins of the controller is reduced. Therefore, how to use the same pin to detect the voltage value at the output terminal of the blocking switch and perform a switching operation on the blocking switch is one of the research focuses of persons skilled in the art.

SUMMARY

The disclosure provides a controller for controlling a blocking switch of a power converter, which can detect a voltage value at an output terminal of the blocking switch and perform a switching operation on the blocking switch using a single pin. In addition, the controller can also accelerate a discharge speed of the voltage value at the output terminal of the blocking switch.

A controller of the disclosure is used to control a blocking switch of a power converter. The controller includes a control pin and a sensing circuit. The control pin is coupled to a control terminal of the blocking switch and an output terminal of the blocking switch. The controller controls a switching operation of the blocking switch through the control pin. The sensing circuit includes a control switch, a variable resistance circuit, and a judgment circuit. A first terminal of the control switch is coupled to the control pin. The variable resistance circuit is coupled between a second terminal of the control switch and a reference low voltage. The judgment circuit is coupled between the second terminal of the control switch and the variable resistance circuit. The judgment circuit controls the variable resistance circuit to provide a detection resistance value with a minimum value during a period when the blocking switch is turned off, turns on the control switch to obtain a sensing voltage value at the second terminal of the control switch, and gradually increases the detection resistance value. When the variable resistance circuit provides the detection resistance value with a maximum value and the sensing voltage value is lower than a reference voltage value, the judgment circuit provides a notification signal for allowing the blocking switch to be turned on.

Based on the above, the controller controls the switching operation of the blocking switch through the control pin. The judgment circuit obtains the sensing voltage value through the control pin and determines whether to provide the notification signal accordingly. The controller of the disclosure can control the switching operation of the blocking switch through the control pin and detect the voltage value at the output terminal of the blocking switch. In this way, the number of pins of the controller can be reduced. In addition, the size of the controller can also be reduced. In addition, the judgment circuit controls the variable resistance circuit to provide the detection resistance value with the minimum value when the blocking switch is turned off. In this way, during the period when the blocking switch is turned off, the controller can accelerate the discharge speed of the voltage value at the output terminal of the blocking switch.

DESCRIPTION OF THE EMBODIMENTS

Figure 1:
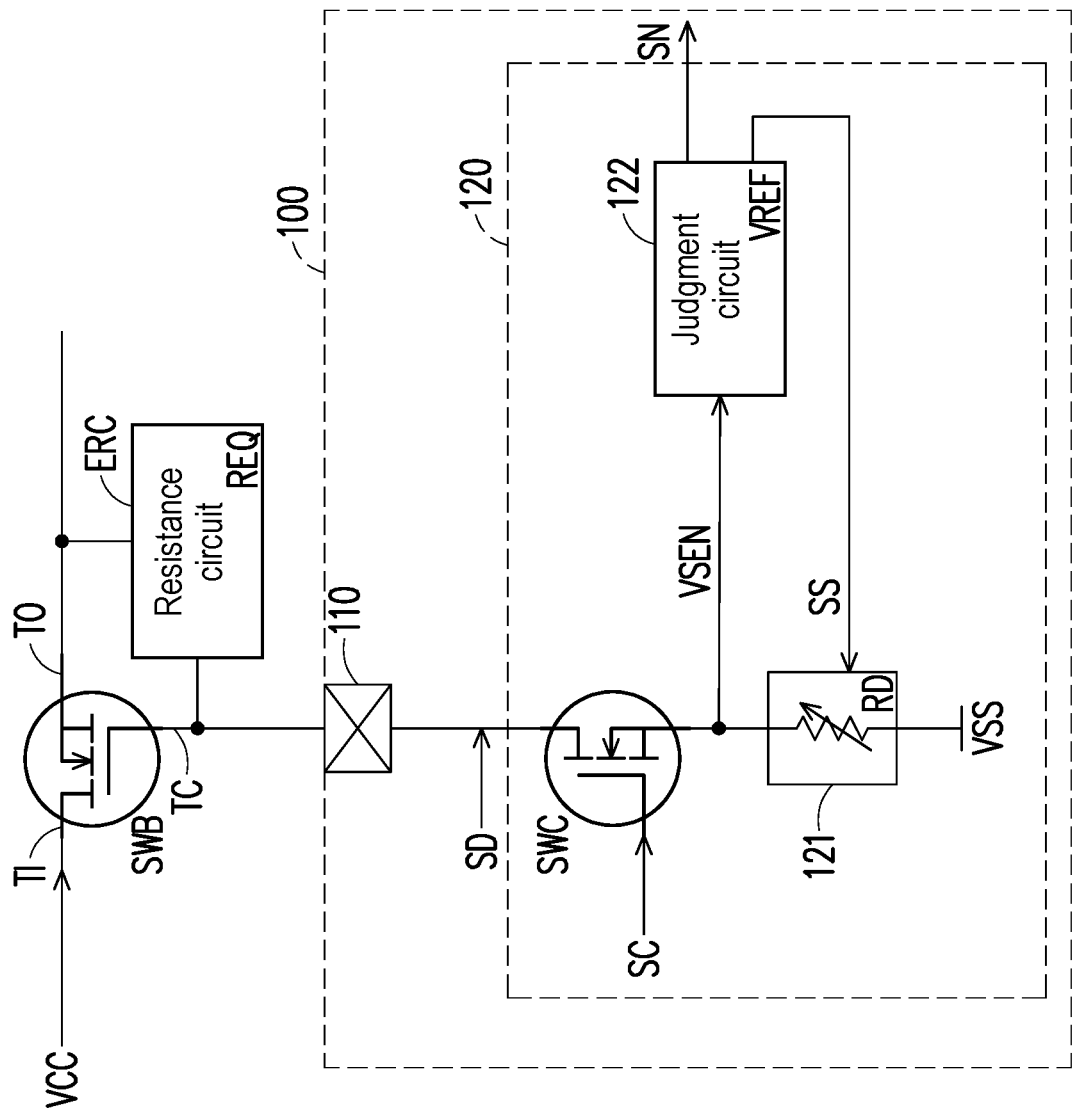
FIG. 1 is a schematic diagram of a blocking switch and a controller according to an embodiment of the disclosure.

Some embodiments of the disclosure will be described in detail with reference to the drawings. For the reference numerals cited in the following description, when the same reference numerals appear in different drawings, the reference numerals will be regarded as referring to the same or similar elements. The embodiments are only a part of the disclosure and do not disclose all possible implementations of the disclosure. More specifically, the embodiments are merely examples in the claims of the disclosure.

Please refer to FIG. 1. FIG. 1 is a schematic diagram of a blocking switch and a controller according to an embodiment of the disclosure. FIG. 1 shows a blocking switch SWB of a power converter and a controller 100 for controlling the blocking switch SWB. In the embodiment, the controller 100 includes a control pin 110 and a sensing circuit 120. The control pin 110 is coupled to a control terminal TC of the blocking switch SWB and an output terminal TO of the blocking switch SWB. The controller 100 controls a switching operation of the blocking switch SWB through the control pin 110.

For example, the blocking switch SWB may be implemented by an n-type field effect transistor. The blocking switch SWB is, for example, an n-metal-oxide-semiconductor (NMOS) field effect transistor. An input terminal TI of the blocking switch SWB receives an output power VCC. The controller 100 provides a control signal SD with a high voltage level to the control terminal TC of the blocking switch SWB through the control pin 110, thereby turning on the blocking switch SWB. Therefore, the blocking switch SWB transmits the output power VCC to the output terminal TO. The controller 100 provides a control signal SD with a low voltage level to the control terminal TC of the blocking switch SWB through the control pin 110, thereby turning off the blocking switch SWB. Therefore, the blocking switch SWB does not transmit the output power VCC to the output terminal TO.

In the embodiment, the sensing circuit 120 includes a control switch SWC, a variable resistance circuit 121, and a judgment circuit 122. A first terminal of the control switch SWC is coupled to the control pin 110. The variable resistance circuit 121 is coupled between a second terminal of the control switch SWC and a reference low voltage VSS. The reference low voltage VSS may be, for example, ground, but the disclosure is not limited thereto.

The judgment circuit 122 is coupled to the second terminal of the control switch SWC and the variable resistance circuit 121. During a period when the blocking switch SWB is turned off, the judgment circuit 122 controls the variable resistance circuit 121 to provide a detection resistance value RD with the minimum value, and turns on the control switch SWC to obtain a sensing voltage value VSEN at the second terminal of the control switch SWC. The judgment circuit 122 controls the variable resistance circuit 121 to gradually increase the detection resistance value RD. When the variable resistance circuit 121 provides the detection resistance value RD with the maximum value and the sensing voltage value VSEN is lower than a reference voltage value VREF, the judgment circuit 122 provides a notification signal SN for allowing the blocking switch SWB to be turned on.

It is worth mentioning here that the controller 100 controls the switching operation of the blocking switch SWB through the control pin 110. The judgment circuit 122 obtains the sensing voltage value VSEN through the control pin 110 and determines whether to provide the notification signal SN accordingly. It can be seen that the controller 100 can control the switching operation of the blocking switch SWB through the control pin 110 and detect the voltage value at the output terminal TO of the blocking switch SWB. In this way, the number of pins of the controller 100 can be reduced. In addition, the size of the controller 100 can also be reduced. In addition, when the blocking switch SWB is turned off, the judgment circuit 122 controls the variable resistance circuit 121 to provide the detection resistance value RD with the minimum value. In this way, during the period when the blocking switch SWB is turned off, the controller 100 can accelerate a discharge speed of the voltage value at the output terminal TO of the blocking switch SWB.

Further, when the variable resistance circuit 121 provides the detection resistance value RD with the maximum value and the sensing voltage value VSEN is lower than the reference voltage value VREF, the judgment circuit 122 learns that the voltage value at the output terminal TO of the blocking switch SWB is lower than a standard voltage value for the blocking switch SWB to be allowed to be turned on, which means that the blocking switch SWB may comply with Vsafe0V standard and is allowed to be turned on. Therefore, the judgment circuit 122 provides the notification signal SN.

In the embodiment, the controller 100 turns off the control switch SWC in response to the notification signal SN, and turns on the blocking switch SWB through the control pin 110.

On the other hand, when the sensing voltage value VSEN is higher than or equal to the reference voltage value VREF, the detection resistance value RD is not changed. In addition, when the sensing voltage value VSEN is higher than or equal to the reference voltage value VREF, the judgment circuit 122 does not provide the notification signal SN. The controller 100 continues to turn off the blocking switch SWB and continues to turn on the control switch SWC. In the embodiment, the control pin 110 is coupled to the output terminal TO of the blocking switch SWB via the resistance circuit ERC. The sensing voltage value VSEN is determined by the voltage value at the output terminal TO of the blocking switch SWB, an equivalent resistance value REQ of the resistance circuit ERC, and the detection resistance value RD.

For example, it is assumed that the voltage value at the output terminal TO of the blocking switch SWB must be lower than the standard voltage value of 0.1 volt for the blocking switch SWB to be allowed to be turned on. When the blocking switch SWB is turned off, the judgment circuit 122 controls the variable resistance circuit 121 using a setting signal SS. The variable resistance circuit 121 provides the detection resistance value RD with the minimum value when the blocking switch SWB is turned off. The detection resistance value RD at this time is, for example, 100 ohms ($\Omega$), but the disclosure is not limited thereto. Therefore, the controller 100 can accelerate the discharge speed of the voltage value at the output terminal TO of the blocking switch SWB. In addition, when the blocking switch SWB is turned off, the judgment circuit 122 also turns on the control switch SWC using the control signal SC. Therefore, the judgment circuit 122 obtains the sensing voltage value VSEN at the second terminal of the control switch SWC.

The judgment circuit 122 compares the received sensing voltage value VSEN with the reference voltage value VREF. When the sensing voltage value VSEN is higher than or equal to the reference voltage value VREF, the detection resistance value RD is not adjusted. On the other hand, when the sensing voltage value VSEN is lower than the reference voltage value VREF, the detection resistance value RD is, for example, increased from 100$\Omega$ to 200$\Omega$, but the disclosure is not limited thereto. The sensing voltage value VSEN is positively correlated with the detection resistance value RD. Therefore, the sensing voltage value VSEN is increased. The judgment circuit 122 continues to compare the received sensing voltage value VSEN with the reference voltage value VREF. When the sensing voltage value VSEN is lower than the reference voltage value VREF, the detection resistance value RD continues to be increased.

In some embodiments, the judgment circuit 122 may control the variable resistance circuit 121 to gradually increase the detection resistance value RD without comparing the sensing voltage value VSEN with the reference voltage value VREF.

When the detection resistance value RD reaches the maximum value (for example, 100 M$\Omega$), the judgment circuit 122 compares the sensing voltage value VSEN corresponding to the detection resistance value RD with the maximum value with the reference voltage value VREF. When the sensing voltage value VSEN corresponding to the detection resistance value RD with the maximum value is lower than the reference voltage value VREF, the judgment circuit 122 provides the notification signal SN.

In the embodiment, the reference voltage value VREF is set as Formula (1).

$$VREF = Vsafe \times \frac{RD\max}{REQ + RD\max} \qquad \text{Formula (1)}$$

In Formula (1), Vsafe is the standard voltage value (for example, 0.1 volts), and RDmax is the detection resistance value RD with the maximum value.

In some embodiments, the standard voltage value may be 0 to 0.8 volts, and the disclosure is not limited to the standard voltage value in the embodiment.

Figure 2:
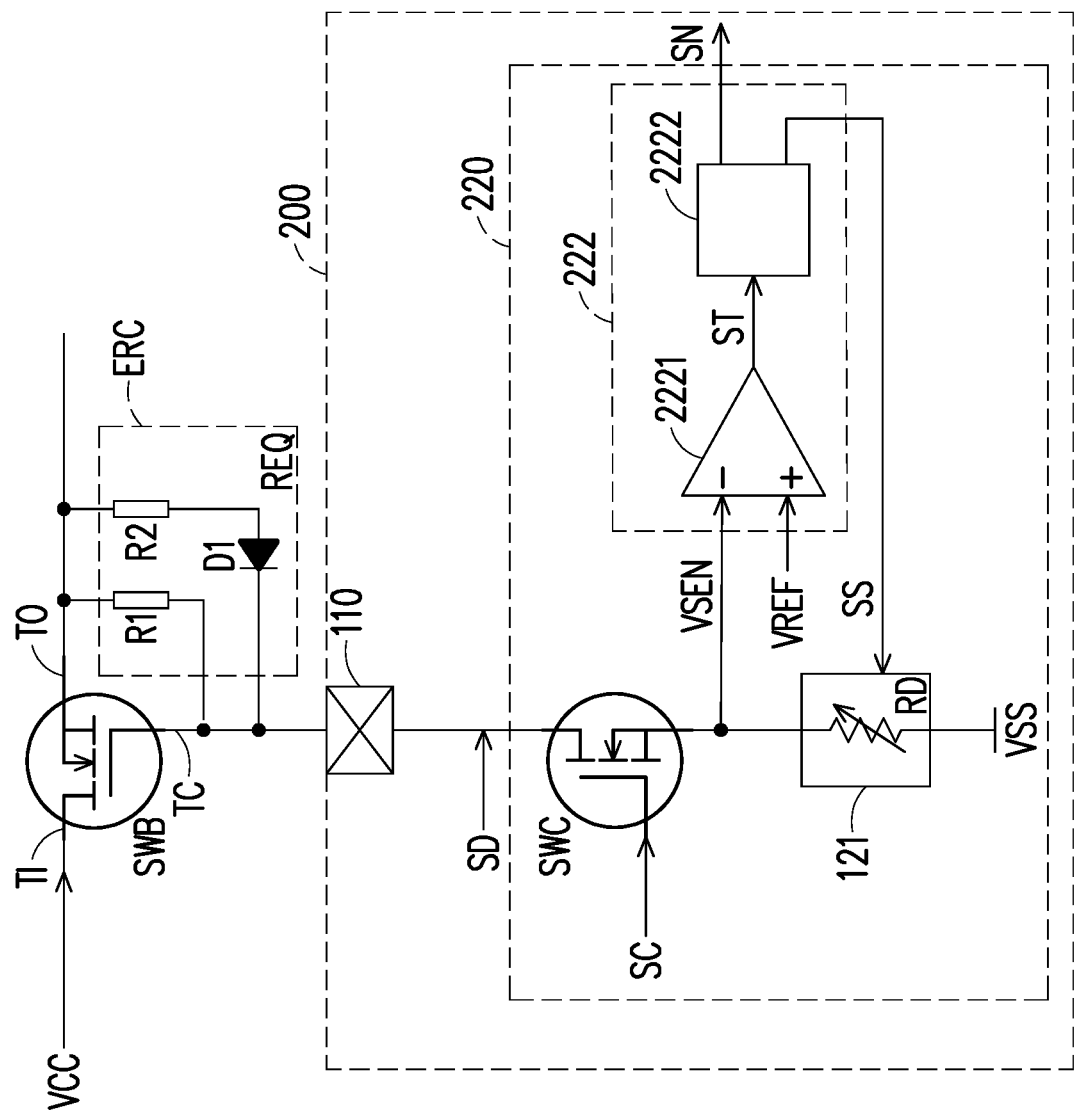
FIG. 2 is a schematic diagram of a blocking switch and a controller according to an embodiment of the disclosure.

Please refer to FIG. 2. FIG. 2 is a schematic diagram of a blocking switch and a controller according to an embodiment of the disclosure. In the embodiment, a controller 200 includes a control pin 110 and a sensing circuit 220. The control pin 110 is coupled to a control terminal TC of a blocking switch SWB and is coupled to an output terminal TO of the blocking switch SWB via a resistance circuit ERC. The controller 200 controls a switching operation of the blocking switch SWB through the control pin 110. The sensing circuit 220 includes a control switch SWC, a variable resistance circuit 121, and a judgment circuit 222. A first terminal of the control switch SWC is coupled to the control pin 110. The variable resistance circuit 121 is coupled between a second terminal of the control switch SWC and a reference low voltage VSS.

In the embodiment, the judgment circuit 222 includes a comparator 2221 and a control circuit 2222. The comparator 2221 is coupled to the second terminal of the control switch SWC. The comparator 2221 compares a sensing voltage value VSEN with a reference voltage value VREF during a period when the blocking switch SWB is turned off. When the sensing voltage value VSEN is lower than the reference voltage value VREF, the comparator 2221 provides a status signal ST. On the other hand, when the sensing voltage value VSEN is higher than or equal to the reference voltage value VREF, the comparator 2221 does not provide the status signal ST. Taking the embodiment as an example, an inverting input terminal of the comparator 2221 receives the sensing voltage value VSEN. A non-inverting input terminal of the comparator 2221 receives the reference voltage value VREF. Therefore, the status signal ST output by the comparator 2221 is a signal with a high voltage level.

The control circuit 2222 is coupled to the comparator 2221 and the variable resistance circuit 121. The control circuit 2222 resets a detection resistance value RD when the blocking switch SWB is turned off. In addition, the control circuit 2222 also controls the variable resistance circuit 121 to increase the detection resistance value RD according to the status signal ST.

In the embodiment, the resistance circuit ERC includes resistors R1 and R2 and a diode D1. The resistor R1 is coupled between the output terminal TO of the blocking switch SWB and the control pin 110. A first terminal of the resistor R2 is coupled to the output terminal TO of the blocking switch SWB. A second terminal of the resistor R2 is coupled to an anode of the diode D1. A cathode of the diode D1 is coupled to the control pin 110.

Figure 3:
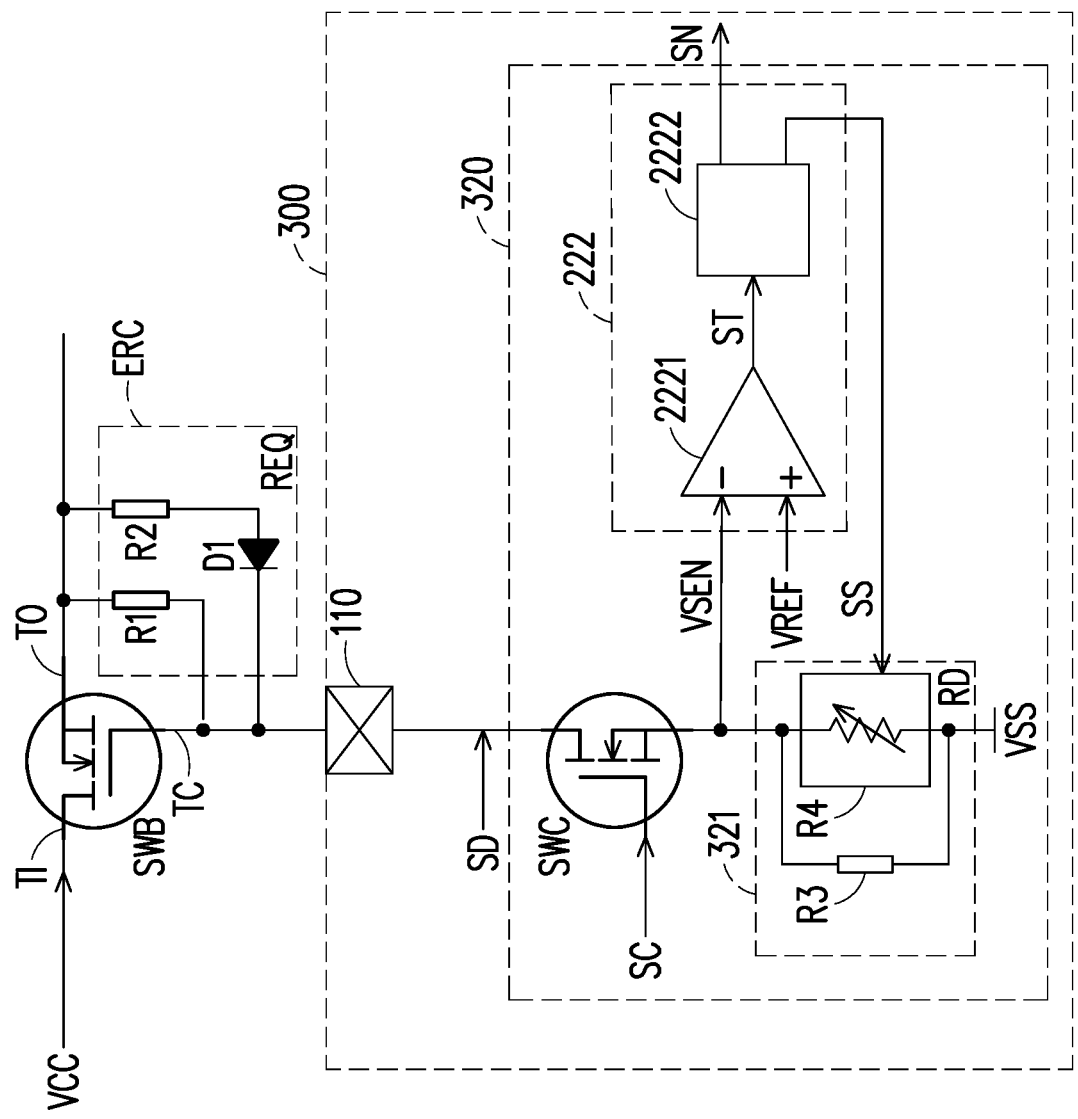
FIG. 3 is a schematic diagram of a blocking switch and a controller according to an embodiment of the disclosure.

Please refer to FIG. 3. FIG. 3 is a schematic diagram of a blocking switch and a controller according to an embodiment of the disclosure. In the embodiment, a controller 300 includes a control pin 110 and a sensing circuit 320. The control pin 110 is coupled to a control terminal TC of a blocking switch SWB and is coupled to an output terminal TO of the blocking switch SWB via a resistance circuit ERC. The controller 300 controls a switching operation of the blocking switch SWB through the control pin 110. The sensing circuit 320 includes a control switch SWC, a variable resistance circuit 321, and a judgment circuit 222. A first terminal of the control switch SWC is coupled to the control pin 110. The variable resistance circuit 121 is coupled between a second terminal of the control switch SWC and a reference low voltage VSS. In the embodiment, the implementation of the resistance circuit ERC, the control switch SWC, and the judgment circuit 222 is clearly explained in the embodiments of FIG. 1 and FIG. 2 and will not be repeated here.

In the embodiment, the variable resistance circuit 321 includes a resistor R3 and a variable resistor R4. The resistor R3 is coupled between the second terminal of the control switch SWC and the reference low voltage VSS. The resistor R3 provides a fixed resistance value. The variable resistor R4 is coupled between the second terminal of the control switch SWC and the reference low voltage VSS. The variable resistor R4 provides a variable resistance value in response to the control of the judgment circuit 222. A detection resistance value RD is determined according to the fixed resistance value and the variable resistance value. Furthermore, the resistor R3 and the variable resistor R4 are coupled to each other in parallel. Therefore, the detection resistance value RD is a parallel connection value of the fixed resistance value and the variable resistance value.

In the embodiment, when the blocking switch SWB is turned off, the variable resistor R4 is controlled to provide the variable resistance value with the minimum value. Therefore, the variable resistance circuit 321 provides the detection resistance value RD with the minimum value when the blocking switch SWB is turned off. Next, when a sensing voltage value VSEN is higher than or equal to a reference voltage value VREF, the variable resistor R4 is not adjusted. Therefore, the detection resistance value RD is not adjusted. On the other hand, when the sensing voltage value VSEN is lower than the reference voltage value VREF, the variable resistor R4 is controlled to increase the variable resistance value. Therefore, the detection resistance value RD is increased.

Figure 4:
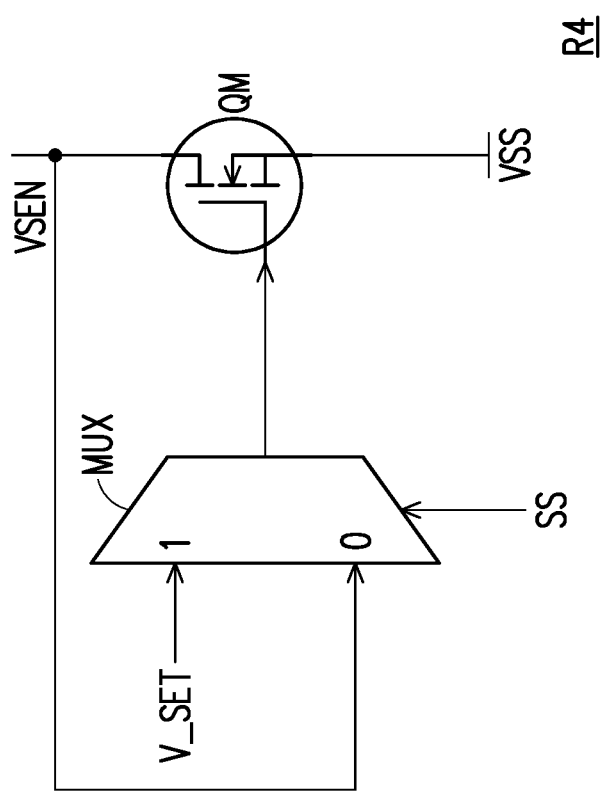
FIG. 4 is a circuit diagram of a variable resistor according to an embodiment of the disclosure.

Please refer to FIG. 3 and FIG. 4 at the same time. FIG. 4 is a circuit diagram of a variable resistor according to an embodiment of the disclosure. In the embodiment, the variable resistor R4 includes a multiplexer MUX and a transistor QM. A first input terminal of the multiplexer MUX receives an initial signal V_SET. A second input terminal of the multiplexer MUX is coupled to the second terminal of the control switch SWC. A setting terminal of the multiplexer MUX is coupled to the judgment circuit 222. The setting terminal of the multiplexer MUX receives a setting signal SS from the judgment circuit 122. A first terminal of the transistor QM is coupled to the second terminal of the control switch SWC. A second terminal of the transistor QM is coupled to the reference low voltage VSS. A control terminal of the transistor QM is coupled to an output terminal of the multiplexer MUX. In the embodiment, the transistor QM is, for example, an NMOS field effect transistor (but the disclosure is not limited thereto).

In the embodiment, when the blocking switch SWB is turned off, the control circuit 2222 provides the setting signal SS with a first logic value. The first logical value is, for example, "1". Therefore, the multiplexer MUX provides the initial signal V_SET to the control terminal of the transistor QM in response to the setting signal SS with the first logic value. The transistor QM is turned on in response to the initial signal V_SET. The transistor QM enters a saturation mode. Therefore, the variable resistor R4 is controlled to provide the variable resistance value with the minimum value. The variable resistance value is substantially equal to an on-resistance value between the first terminal of the transistor QM and the second terminal of the transistor QM. Therefore, the variable resistance circuit 321 provides the detection resistance value RD with the minimum value when the blocking switch SWB is turned off.

During a period when the blocking switch SWB is turned off, the comparator 2221 compares the sensing voltage value VSEN with the reference voltage value VREF. When the sensing voltage value VSEN is lower than the reference voltage value VREF, the comparator 2221 provides a status signal ST. Therefore, the control circuit 2222 provides the setting signal SS with a second logic value. The second logical value is, for example, "0". Therefore, the multiplexer MUX provides the sensing voltage value VSEN to the control terminal of the transistor QM in response to the setting signal SS with the second logic value.

During a period when the control switch SWC is turned on, the voltage value at the output terminal TO of the blocking switch SWB is discharged. Therefore, the voltage value at the output terminal TO of the blocking switch SWB is reduced. The sensing voltage value VSEN also decreases. Therefore, the transistor QM enters a linear mode. Therefore, the variable resistance value is increased as the sensing voltage value VSEN decreases. The detection resistance value RD is also increased. When the transistor QM is turned off, the variable resistance value has the maximum value. Therefore, the detection resistance value RD with the minimum value is substantially equal to the fixed resistance value of the resistor R3.

In summary, the controller of the disclosure includes the control pin and the sensing circuit. The control pin is coupled to the control terminal of the blocking switch and the output terminal of the blocking switch. The controller controls the switching operation of the blocking switch through the control pin. The judgment circuit obtains the sensing voltage value through the control pin and determines whether to provide the notification signal accordingly. The controller can control the switching operation of the blocking switch through the control pin and detect the voltage value at the output terminal of the blocking switch. In this way, the number of pins of the controller can be reduced. In addition, the size of the controller can also be reduced. In addition, when the blocking switch is turned off, the variable resistance circuit provides the detection resistance value with the minimum value to accelerate the discharge speed of the voltage value at the output terminal of the blocking switch.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A controller for controlling a blocking switch of a power converter, comprising:
    a control pin, coupled to a control terminal of the blocking switch and an output terminal of the blocking switch, wherein the controller controls a switching operation of the blocking switch through the control pin; and
    a sensing circuit, comprising:
        a control switch, wherein a first terminal of the control switch is coupled to the control pin;
        a variable resistance circuit, coupled between a second terminal of the control switch and a reference low voltage; and
        a judgment circuit, coupled to the second terminal of the control switch and the variable resistance circuit, and configured to control the variable resistance circuit to provide a detection resistance value with a minimum value during a period when the blocking switch is turned off, turn on the control switch to obtain a sensing voltage value at the second terminal of the control switch, and gradually increase the detection resistance value,
    wherein when the variable resistance circuit provides the detection resistance value with a maximum value and the sensing voltage value is lower than a reference voltage value, the judgment circuit provides a notification signal for allowing the blocking switch to be turned on.

2. The controller according to claim 1, wherein the controller turns off the control switch in response to the notification signal, and turns on the blocking switch through the control pin.

3. The controller according to claim 1, wherein when the sensing voltage value is higher than or equal to the reference voltage value, the judgment circuit does not provide the notification signal.

4. The controller according to claim 1, wherein when the sensing voltage value is higher than or equal to the reference voltage value, the controller continues to turn off the blocking switch and continues to turn on the control switch.

5. The controller according to claim 1, wherein when the variable resistance circuit provides the detection resistance value with the maximum value and the sensing voltage value is lower than the reference voltage value, the judgment circuit learns that a voltage value at the output terminal of the blocking switch is lower than a standard voltage value for the blocking switch to be allowed to be turned on.

6. The controller according to claim 1, wherein the control pin is coupled to the output terminal of the blocking switch via a resistance circuit.

7. The controller according to claim 6, wherein the sensing voltage value is determined by a voltage value at the output terminal of the blocking switch, an equivalent resistance value of the resistance circuit, and the detection resistance value.

8. The controller according to claim 1, wherein the judgment circuit comprises:
    a comparator, coupled to the second terminal of the control switch and configured to compare the sensing voltage value with the reference voltage value during the period when the blocking switch is turned off, and provide a status signal when the sensing voltage value is lower than the reference voltage value; and
    a control circuit, coupled to the comparator and the variable resistance circuit, and configured to reset the detection resistance value when the blocking switch is turned off, and control the variable resistance circuit to increase the detection resistance value according to the status signal.

9. The controller according to claim 1, wherein the variable resistance circuit comprises:
    a resistor, coupled between the second terminal of the control switch and the reference low voltage, and configured to provide a fixed resistance value; and
    a variable resistor, coupled between the second terminal of the control switch and the reference low voltage, and configured to provide a variable resistance value in response to control of the judgment circuit,
    wherein the detection resistance value is determined according to the fixed resistance value and the variable resistance value.

10. The controller according to claim 9, wherein the variable resistor comprises:

a multiplexer, wherein a first input terminal of the multiplexer receives an initial signal, a second input terminal of the multiplexer is coupled to the second terminal of the control switch, and a setting terminal of the multiplexer is coupled to the judgment circuit; and a transistor, wherein a first terminal of the transistor is coupled to the second terminal of the control switch, a second terminal of the transistor is coupled to the reference low voltage, and a control terminal of the transistor is coupled to an output terminal of the multiplexer.

* * * * *